No. 628,548. Patented July 11, 1899.
B. PHELAN.
BICYCLE SUPPORT.
(Application filed May 17, 1897.)

(No Model.)

WITNESSES
Wm H. Bates
J Sprigg Poole

INVENTOR
Bryan Phelan
by Herbert W. T. Jenner.
Attorney

THE NORRIS PETERS CO., PHOTO-LITHO., WASHINGTON, D. C.

UNITED STATES PATENT OFFICE.

BRYAN PHELAN, OF LONDON, ENGLAND.

BICYCLE-SUPPORT.

SPECIFICATION forming part of Letters Patent No. 628,548, dated July 11, 1899.

Application filed May 17, 1897. Serial No. 636,946. (No model.)

*To all whom it may concern:*

Be it known that I, BRYAN PHELAN, a subject of the Queen of Great Britain, residing in London, in the county of Middlesex, England, have invented a certain new and useful Improved Bicycle-Support, of which the following is a specification.

This invention consists in an improved bicycle-support which may be brought into action by the rider from time to time without dismounting, so that the bicycle may be supported when at rest—that is to say, when the requirements of traffic necessitate that the rider should stop or when for any other reason the rider desires to stop for a time without dismounting—and which will also afford steadiness to the bicycle for the purpose of mounting or dismounting and serve as a support or stand when the bicycle is not in use. Hitherto all attempts in this direction have failed owing either to the support being placed on some part of the bicycle-frame where it cannot efficiently support the frame or owing to insufficient means for withstanding the strains which are set up when the device is brought into use, such strains being often exerted in such a way as to overthrow the rider.

The improvements consist in the construction by which this support receives its strength, and more particularly by which it is enabled to withstand and relieve the bicycle-frame of the strains invariably set up when the support is brought into use during riding, which strains are, first, a lateral twisting strain, due to the one wheel of the support almost invariably touching the ground before the other; secondly, an upward or downward bending strain, due to the swaying of the body of the rider and the bicycle at and following the moment of stopping.

The invention more especially also obtains its efficiency from the position it occupies on the bicycle-frame, where its operation is effective to support the bicycle.

Figure 1:
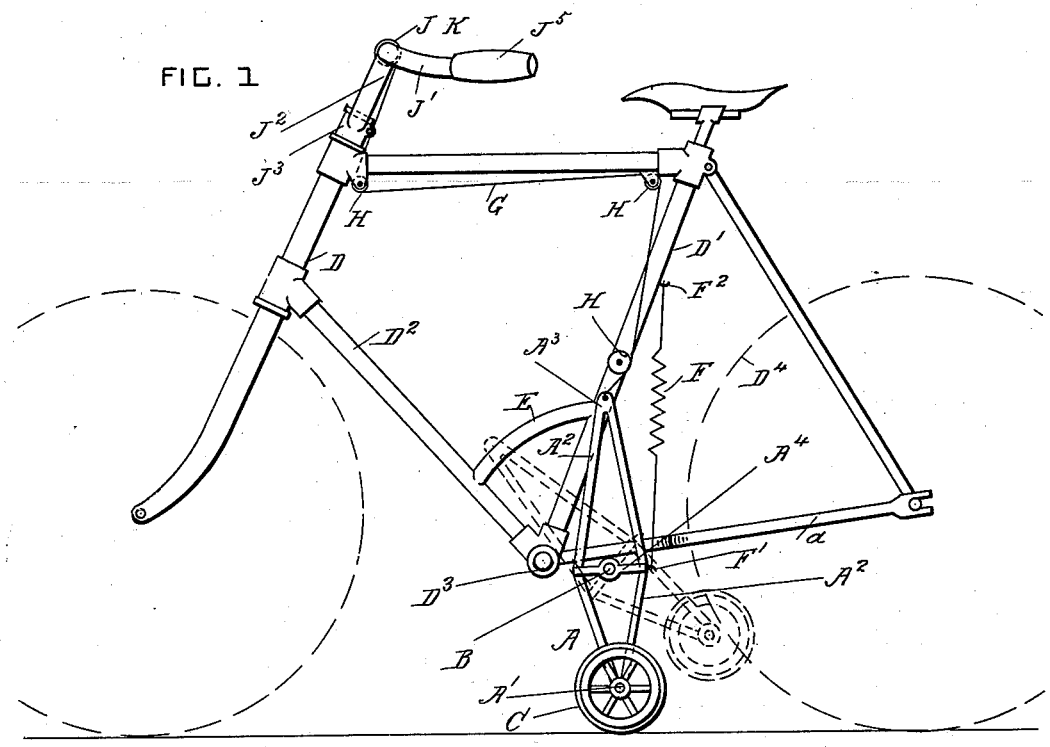
Figure 2:
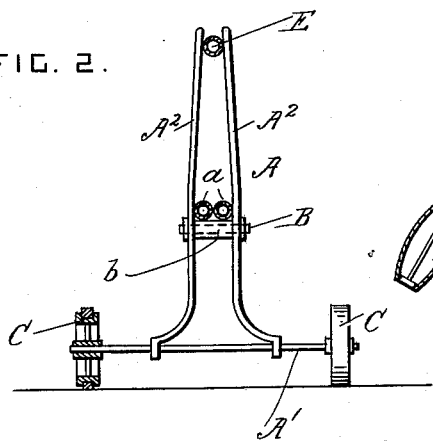
Figure 3:
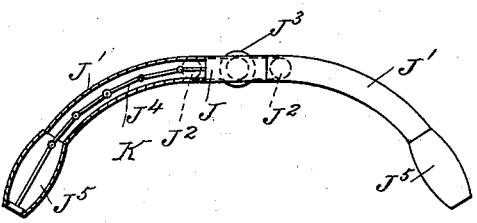

In the annexed drawings, Figure 1 shows in side elevation a bicycle-frame fitted with the improved support. Fig. 2 is a diagrammatic view or section showing the support from the front or rear and certain of the cycle-frame tubes in section. Fig. 3 is a plan view, partly in section, of the handle-bar of the bicycle adapted for operating this support.

The invention is based upon that form of support in which a frame hinged near or behind the pedal-crank-shaft bracket carries two wheels adapted to come in contact with the ground at a distance one on each side of the plane of the bicycle. Heretofore such frames have been proposed, but have been simply pivoted or hinged and have been utterly unable to meet the strain set up in bringing them into action. The present frame A is so made that it has (considering the frame in the position shown in full lines in Fig. 1—namely, in action) lateral extension to each side of its axle B to bear against the frame of the bicycle—for instance, against the lower back tubes $a\ a$—at points in front of and behind the vertical transverse plane containing the axis of the frame A, thus having bearing to withstand the before-mentioned lateral twisting strain. Such frame A is also made with extensions above the axle B to also have bearing against the diagonal tube of the bicycle-frame at a point remote from the axle B, and principally at the time when the wheels C of frame A are in contact with the ground to meet the swaying strain before referred to.

D represents the cycle-frame, of that variety known as "diamond" frame.

$D'$ is the diagonal or seat-pillar tube; $D^2$ the lower front tube.

E is a tube or guide extending from tube $D'$ to tube $D^2$, preferably in an arc of a circle of which the axle B is the center.

The lower back tubes $a\ a$ are brought together for the necessary distance rearward of the pedal-crank-shaft bracket $D^3$ (see Fig. 2) and before they spread apart for the wheel $D^4$, and below tubes $a\ a$ is brazed a cross-tube $b$, serving as bearing for the axle B of frame A.

Frame A comprises a horizontal bar or tube $A'$, the ends of which form axles for wheels C C, and two side parts each consisting of tubes $A^2 A^2$, meeting below on bar $A'$ and above at a point $A^3$ on a level with tube E and spaced apart at the middle by a cross-piece $A^4$, carrying in the middle the axle B. The tubes $A^2 A^2$ have bearing against the tubes $a\ a$ and the point $A^3$ when the frame is in action against tube $D'$. The frame A must be so made as not to obstruct the pedal-crank, sprocket-wheel, or gear-chain. (Not shown in the drawings.) The stay or guide E is intended to guide the frame A when out of action.

F is a spring connected at F' to the frame A and at F² to the tube D', and tends to draw the frame A out of action, as in dotted lines, Fig. 1.

G is a cord attached to the upper end of frame A and brought within reach of the rider in any suitable way. In the construction illustrated in the drawings the cord G is passed around pulleys H H H and connected to a drum J, Fig. 3.

K is the handle-bar, consisting of two hollow arms J' J', connected by parts J² to each other and to the vertical tube J³ of the handle-bar. The drum J lies between the inner ends of arms J' J' and may be revolved by the universal jointed rods J⁴, extending through one or both arms J' and connected to one or both rotary handles J⁵, so that by revolving the handle or handles the frame A is drawn into the position shown in full lines in Fig. 1.

The wheels C should have tires as solid and non-resilient as possible, to avoid oscillation; but to avoid the unpleasant noise made by metal tires in contact with the ground the tires may be of firm and solid leather.

I do not claim, broadly, a pivoted frame to carry supporting-wheels; but

What I claim is—

1. The combination, with the frame of a safety-bicycle provided with a crank-axle bearing, a seat-pillar tube D', and two lower back tubes $a\ a$, all the said tubes being connected to the said bearing and the said tubes $a\ a$ having their front end portions arranged parallel to each other; of a frame A pivoted to the said bicycle-frame under the tubes $a\ a$ and behind the said bearing, the upper portion of the frame A being formed of pairs of bars connected at their upper ends and which straddle and bear against the tubes D' and $a\ a$, and ground-wheels carried by the lower portion of the said frame A, substantially as described and shown.

2. The combination, with the frame of a safety-bicycle provided with a seat-pillar tube D', two lower back tubes $a\ a$ having their front end portions arranged parallel to each other, and a cross-tube $b$ secured under the front end portions of the tubes $a\ a$; of a frame A having its upper portion formed of pairs of bars connected at their upper ends and which straddle and bear against the tubes D' and $a\ a$, ground-wheels carried by the lower portion of the frame A, and an axle B engaging with the tube $b$ and pivotally supporting the frame A, substantially as described and shown.

3. The combination, with a safety-bicycle; of a frame A having its middle portions pivotally supported by the bicycle-frame, the upper portions of the said frame A being triangular and arranged to straddle the bicycle-frame and bear against it at three points on each side, one of each three points being at the top part of the frame A and the other two points being at its middle part and to the front and rear of its pivot respectively; and ground-wheels C carried by the lower portions of the frame A, substantially as described and shown.

4. The combination, with the frame of a safety-bicycle provided with two lower back tubes the front end portions of which are arranged parallel with each other; of a skeleton frame A pivoted to the parallel portions of the said tubes and bearing against them on each side in front of and behind the pivot, said frame A comprising bars A² connected at their opposite ends and arranged in pairs on each side of the bicycle-frame and above and below the said pivot, and bars A⁴ connecting the adjacent portions of the bars A²; an axle A' extending transversely under the bicycle-frame and carried by the lower part of the frame A, and ground-wheels carried by the end portions of the said axle, substantially as set forth.

In witness whereof I have signed this specification in presence of two witnesses.

B. PHELAN.

Witnesses:
 A. J. HADDAN,
 CHAS. ROCHE.